US012583168B2

(12) United States Patent        (10) Patent No.:     US 12,583,168 B2
Atance Orden et al.                  (45) Date of Patent:        Mar. 24, 2026

(54) INJECTION-BLOW-MOULDING MOULD AND METHOD

(71) Applicant: Molmasa Aplicaciones Tecnicas, SL, Montcada i Reixac (ES)

(72) Inventors: Angel Atance Orden, Barcelona (ES); David Carrillo Guerrero, Cerdanyola del Valles (ES)

(73) Assignee: Molmasa Aplicaciones Tecnicas, SL, Montcada i Reixac (ES)

( * ) Notice: Subject to any disclaimer, the term of this patent is extended or adjusted under 35 U.S.C. 154(b) by 70 days.

(21) Appl. No.: 18/261,171

(22) PCT Filed: Jan. 12, 2022

(86) PCT No.: PCT/EP2022/050515
§ 371 (c)(1),
(2) Date: Jul. 12, 2023

(87) PCT Pub. No.: WO2022/152737
PCT Pub. Date: Jul. 21, 2022

(65) Prior Publication Data
US 2024/0066782 A1      Feb. 29, 2024

(30) Foreign Application Priority Data

Jan. 13, 2021    (EP) .................................... 21382013

(51) Int. Cl.
B29C 49/06        (2006.01)
B29C 49/48        (2006.01)
(Continued)

(52) U.S. Cl.
CPC .......... B29C 49/06 (2013.01); B29C 49/4823 (2013.01); B29C 49/58 (2013.01); (Continued)

(58) Field of Classification Search
CPC ......... B29C 49/62; B29C 49/06; B29C 49/66; B29C 49/58; B29C 49/4823; (Continued)

(56) References Cited

U.S. PATENT DOCUMENTS 3,337,666 A * 8/1967 Wilkins .................. B29C 49/50
425/526
3,944,141 A    3/1976 Siczek
(Continued)

FOREIGN PATENT DOCUMENTS

DE          2605967 A1    8/1977
WO    WO2017093578 A1    6/2017

OTHER PUBLICATIONS

European Patent Office; International Search Report and Written Opinion for PCT/EP2022/050515; Mar. 22, 2022; entire document.

*Primary Examiner* — Monica A Huson
(74) *Attorney, Agent, or Firm* — ALLEN, DYER, DOPPELT + GILCHRIST, P.A.

(57)             ABSTRACT

The injection-blow-moulding mould comprises: a punch (1) having a blow opening (3) connected to a first conduit (5) which is in communication with a first source of pressurised gas supply (6) configured to supply pressurised gas through the blow opening (3) at an overpressure (OP) above a blowing pressure (BP) suitable to blow a preform (30a) into a container (30b) and an exhaust opening (4) connected to a second conduit (7) which is in communication with a pressure-limiting device set at the blowing pressure (BP); a blow-moulding cavity (2) configured to receive therein the punch (1) with a hot and soft preform (30a) arranged thereon; and a cooling device associated to the blow-moulding cavity (2). Gas inside the container (30b) exceeding the blowing pressure (BP) is allowed to escape through
(Continued)

the exhaust opening (4) thereby a cooling gas stream is created from the blow opening (3) to the exhaust opening.

17 Claims, 6 Drawing Sheets

(51) Int. Cl.
| | |
|---|---|
| *B29C 49/58* | (2006.01) |
| *B29C 49/62* | (2006.01) |
| *B29C 49/64* | (2006.01) |
| *B29C 49/66* | (2006.01) |
| B29C 49/02 | (2006.01) |
| B29K 105/00 | (2006.01) |
| B29L 31/00 | (2006.01) |

(52) U.S. Cl.
CPC .............. *B29C 49/62* (2013.01); *B29C 49/66* (2013.01); *B29C 49/6604* (2022.05); *B29C 2049/023* (2013.01); *B29C 2049/4825* (2013.01); *B29C 2049/4887* (2013.01); *B29C 2049/6607* (2013.01); *B29C 2049/6615* (2013.01); *B29C 2049/6646* (2013.01); *B29C 2949/0771* (2022.05); *B29K 2105/258* (2013.01); *B29L 2031/716* (2013.01)

(58) Field of Classification Search
CPC ........ B29C 49/6604; B29C 2949/0771; B29C 2049/5841; B29C 2049/4889; B29C 2049/4846; B29C 2049/6615; B29C 2049/4825; B29C 49/42085; B29C 49/071; B29C 2049/6646; B29C 2049/4887; B29C 2049/023; B29C 2049/6607; B29L 2031/716; B29K 2995/0051; B29K 2105/258
See application file for complete search history.

(56) References Cited

U.S. PATENT DOCUMENTS

| | | | |
|---|---|---|---|
| 3,944,645 | A | 3/1976 | Farrell |
| 4,070,141 | A | 1/1978 | Ryder |
| 2012/0100241 | A1 | 4/2012 | Parrinello |

* cited by examiner

INJECTION-BLOW-MOULDING MOULD AND METHOD

FIELD OF THE INVENTION

The present invention generally relates to an injection-blow-moulding mould and method and more in particular to a mould and a method for injection-moulding plastic preforms and blow-moulding the preforms into containers. The injection-blow-moulding mould and the method are useful for a container-forming machine.

BACKGROUND ART

A type of container-forming machines comprising a preform-forming unit configured to form preforms by injection of molten plastic material in a preform mould and a container-forming unit configured to form containers by blowing the preforms in a blow-moulding mould are known.

In this known type of container-forming machines, the preform mould comprises a preform-moulding cavity which has an inner surface defining an outer surface of the preform in cooperation with a punch which has an outer surface defining an inner surface of the preform, and the injection-blow-moulding mould comprises a blow-moulding cavity which has an inner surface defining an outer surface of the containers to be obtained by blowing the preforms, the blow-moulding cavity being configured to receive therein the punch with one of the preforms arranged on the punch in a hot and soft state.

The injection-blow-moulding mould comprises a blowing device configured to deliver a pressurised gas to the interior of the heated and soft preform through one or more blow openings located in the punch when the punch carrying the preform is located inside the blow-moulding cavity in order to expand the preform until the expanded preform is applied to the inner surface of the blow-moulding cavity to form the container, and a cooling device associated to the blow-moulding cavity and configured to cool the outer surface of the container which is in contact with the inner surface of the blow-moulding cavity.

Different types of transfer devices for transferring the punch carrying thereon the heated and soft preform from the preform-moulding cavity to the blow-moulding cavity are known.

Document WO 2017093578 A1 discloses an injection and blow mould comprising one or more rows of moulding cavities arranged on a base plate, each row of cavities including an integer number n greater than one of injection-moulding cavities and a number n+1 of blow-moulding cavities alternating with each other and mutually aligned, with blow-moulding cavities on opposite ends of the row, and one or more rows of punches arranged on a mobile plate, each row of punches including a number 2n of mutually aligned punches. The mobile plate is actuated to perform alternating movements to transfer the punches from the injection-moulding cavities to the blow-moulding cavities and vice versa.

The mould of cited document WO 2017093578 A1 further includes a plurality of injection nozzles configured to inject a molten plastic material to the injection-moulding cavities in order to mould preforms on the punches which are in the injection-moulding cavities and a blowing device configured to supply compressed gas through blow openings located in the punches to the interior of the preforms arranged on the punches which are in the blow-moulding cavities in order to expand the preforms into containers. The injection-moulding cavities and the blow-moulding cavities are formed in respective individual injection blocks and individual blow blocks separate from each other. The blow blocks are cooled by a cooling fluid circulating via cooling conduits arranged inside the blow blocks in order to cool an outer surface of the containers in contact with an inner surface of the blow-moulding cavities.

In any case, the containers once formed have to reach a lower temperature than a temperature of the blow-moulding mould for acquiring enough consistency to enable being extracted from the injection-blow-moulding mould without deforming, and this temperature lowering takes a time that slows the production rate of the container-forming machine.

When injection-blow-moulding moulds having a cooling device comprising, for example, a cooling fluid circulating via cooling conduits in the blow-moulding cavities are used, the cooling device cools only the outer surface of the container which is in contact with the inner surface of the blow-moulding cavity but does not cool the inner surface of the container, thereby a relatively long cooling time is still required before the container can be extracted from the injection-blow-moulding mould without deforming.

DE2605967A1 refers to a blow moulding that is internally cooled by circulating mist—supplied and extracted through internal ducts in blowing mandrel disclosing an injection-blow-moulding mould comprising in combination the features included in the preamble of claim 1 of this patent application.

U.S. Pat. No. 3,944,141 also discloses such a mould although it uses in addition a pressure bag.

However, there is a need for an injection-blow-moulding mould provided with means for cooling both the outer and inner surfaces of the container once expanded in the blow-moulding cavity in order to reduce the necessary cooling time before the finished container can be extracted from the injection-blow-moulding mould.

DISCLOSURE OF THE INVENTION

According to a first aspect, the present invention contributes to fulfilling the above need by providing an injection-blow-moulding mould comprising a punch having an outer surface which defines an inner surface of preforms made of plastic, an injection-moulding cavity having an inner surface defining an outer surface of the preforms is configured to receive therein the punch, and a blow-moulding cavity having an inner surface defining an outer surface of containers to be obtained by blowing the preforms.

The injection-moulding cavity is configured to receive therein the punch, and an injection device is configured to inject a molten plastic material in the injection-moulding cavity through one or more injection nozzles when the punch is located inside the injection-moulding cavity, whereby the preforms are formed.

The blow-moulding cavity is configured to receive therein the punch with one of the preforms arranged on the punch in a hot and soft state, and a blowing device is configured to deliver a pressurised gas to the interior of the hot and soft preform through one or more blow openings located in the punch when the punch carrying the preform is located inside the blow-moulding cavity, whereby the preform is expanded and blow-moulded to adopt the shape of the container defined by the inner surface of the blow-moulding cavity.

A transfer device can be optionally provided for transferring the punch from the injection-moulding cavity to the blow-moulding cavity, and vice versa.

In order to cool an outer surface of the formed container which is in contact with the inner surface of the blow-moulding cavity, the injection-blow-moulding mould is provided with a cooling device configured to cool the inner surface of the blow-moulding cavity.

The one or more blow openings are connected to a first conduit which is in communication with a first source of pressurised gas supply configured to supply pressurised gas through the one or more blow openings at an overpressure above a blowing pressure, with the blowing pressure being a pressure suitable or enough to expand the preform into the shape of the container by blow-moulding.

The blowing device further comprises one or more exhaust openings located in the punch at a position spaced apart from the one or more blow openings and connected to a second conduit which is in communication with a pressure-limiting device set at the blowing pressure. The pressure-limiting device allows the gas inside the container, when it exceeds the blowing pressure, to escape through the one or more exhaust openings.

Thus, when the preform is completely expanded into the container, the gas inside the container exceeds the blowing pressure and a gas stream is created from the one or more blow openings to the one or more exhaust openings that cools an inner surface of the container, which adds to the cooling of the outer surface of the container performed by the cooling device and contributes to shorten the cooling time necessary for the finished container can be extracted from the blow-moulding cavity without deforming, thereby enhancing the production rate.

When using the injection-blow moulding mould of the present invention, the improvement achieved by cooling the wall of the container at the same time by the inside and by the outside contributes to create a solid skin at both sides of the plastic wall of the container, thus providing a stable structure for the container that prevents subsequent deformations.

The pressure-limiting device comprises, according to a first variant of the blowing device, a pressure-limiting valve located in the second conduit and configured to allow the pressurized gas to escape from the interior of the container through the one or more exhaust openings when the pressure in the interior of the container is above the blowing pressure.

All the above features that will be illustrated in FIGS. 1 to 3B of the drawings pertain to the prior art as disclosed for example in the referred DE2605967A.

According to a second variant of the blowing device which constitutes the core of this invention, the pressure-limiting device comprises a second pressurised gas supply source in communication with the second conduit and configured to supply pressurised gas through the one or more exhaust openings at the blowing pressure when the pressure in the interior of the preform is below or at the blowing pressure and to retrieve pressurized gas flowing out the container through the one or more exhaust openings when the pressure in the interior of the preform is above the blowing pressure.

In a third variant of the blowing device, the pressure-limiting device also comprises a second pressurised gas supply source in communication with the second conduit and configured to supply pressurised gas through the one or more exhaust openings at the blowing pressure, and a pressure-limiting valve located in the second conduit and configured to allow the pressurized gas to flow from the second pressurised gas supply source to the interior of the preform through the one or more exhaust openings when the pressure in the interior of the preform is below or at the blowing pressure and to allow the pressurized gas to escape from the interior of the container through the exhaust opening when the pressure in the interior of the container is above the blowing pressure.

The injection-blow-moulding mould further comprises an opening and closing device configured to open and close the one or more blow openings and the one or more exhaust openings when the punch carrying the preform is located inside the blow-moulding cavity.

To that end, the punch comprises a base body and a forming body. The forming body is movable with respect to the base body in an axial direction coaxial to a longitudinal axis of the punch between an open position and a closed position. In the open position a gap between the base body and the forming body is formed which provides a proximal gas passage. In the closed position there is no gap or gas passage between the base body and the forming body.

The punch further comprises a valve body which is movable with respect to the forming body in the axial direction between an open position and a closed position. In the open position a gap between the forming body and the valve body is formed which provides a distal gas passage. In the closed position there is no gap or gas passage between the forming body and the valve body.

In a first example, the proximal gas passage is connected to the second conduit so that the proximal gas passage constitutes the one or more exhaust openings, and the distal gas passage is connected to the first conduit so that the distal gas passage constitutes the one or more blow openings. An actuator is operatively connected to move the forming body between the open position and the closed position in order to open and close the one or more exhaust openings, and an elastic element is arranged to bias the valve body to the closed position, with the elastic element being set to allow the valve body to be moved to the open position by the effect of the overpressure in the first conduit, in order to open and close the one or more blow openings.

In this first example, the one or more blow openings, which are provided by the distal gas passage, are preferably formed as a single aperture all around the longitudinal axis of the punch, and are optionally located at a distal area of the punch defining a region of the preform intended to form a bottom of the container, and the one or more exhaust openings, which are provided by the proximal gas passage, are preferably formed as a single opening all around the longitudinal axis of the punch, and are optionally located at a proximal area of the punch defining a region of the preform intended to form a shoulder of the container.

In a second example, the proximal gas passage is connected to the first conduit so that the proximal gas passage constitutes the one or more blow openings, and the distal gas passage is connected to the second conduit so that the distal gas passage constitutes the one or more exhaust openings. A first actuator is operatively connected to move the forming body between the open position and the closed position in order to open and close the one or more blow openings, and a second actuator is operatively connected to move the valve body between the open position and the closed position in order to open and close the one or more exhaust openings.

In this second embodiment, the one or more blow openings, which are provided by the proximal gas passage, are preferably formed as a single opening all around the longitudinal axis of the punch, and are optionally located at a proximal area of the punch defining a region of the preform intended to form a shoulder of the container, and the one or more exhaust openings, which are provided by the distal gas passage, are preferably formed as a single opening all around the longitudinal axis of the punch, and are optionally located at a distal area of the punch defining a region of the preform intended to form a bottom of the container.

Throughout this specification, the term "proximal" is used to designate a site near the base body of the punch and the term "distal" is used to designate a site away from the base body of the punch.

Any one of the first, second and third variants of the blowing device can be combined with any one of the first and second embodiments of the injection-blow moulding mould without departing from the scope of the present invention.

According to a second aspect, the present invention provides an injection-blow-moulding method comprising the following conventional steps:

firstly, the method comprises receiving a punch in an injection-moulding cavity, with the punch defining an inner surface of preforms and the injection-moulding cavity defining an outer surface of the preforms.

then, the method comprises injecting a molten plastic material to the injection-moulding cavity through at least one injection nozzle of an injection device when the punch is located inside the injection-moulding cavity to form one of the preforms.

in a subsequent step, the method comprises receiving the punch carrying one of the preforms in a hot and soft state arranged thereon inside a blow-moulding cavity which defines an outer surface of a container to be obtained.

then, the method comprises delivering a pressurised gas to the interior of the preform through one or more blow openings located in the punch when the punch carrying the preform is located inside the blow-moulding cavity in order to expand the preform into the container by blowing or blow-moulding mould the preform. As a final conventional step, the method comprises cooling the outer surface of the container in contact with the blow-moulding cavity by a cooling device associated to the blow-moulding cavity before extracting the container from the mould.

The injection-blow-moulding method of the present invention further comprises, as additional distinguishing steps, supplying the pressurised gas through the one or more blow openings at an overpressure above a blowing pressure by means of a first source of pressurised gas supply in communication with a first conduit connected to the one or more blow openings, with the blowing pressure being a pressure suitable or enough to expand the hot and soft preform into the container by blow moulding, and then, when the pressure in the interior of the container is above the blowing pressure, causing the pressurized gas to escape from the interior of the container through one or more exhaust openings provided in the punch in positions spaced apart from the one or more blow openings, with the one or more exhaust openings being connected to a second conduit which is in communication with a pressure-limiting device set at the blowing pressure.

Thereby, when the preform is completely expanded into the shape of the container, the gas inside the container exceeds the blowing pressure and a gas stream is created from the one or more blow openings to the one or more exhaust openings and the gas stream cools an inner surface of the container.

BRIEF DESCRIPTION OF THE DRAWINGS

The foregoing features and advantages will be more fully understood from the following detailed description of several illustrative and not limitative embodiments with reference to the accompanying drawings, in which.

DETAILED DESCRIPTION OF SEVERAL EMBODIMENTS

Figure 1:
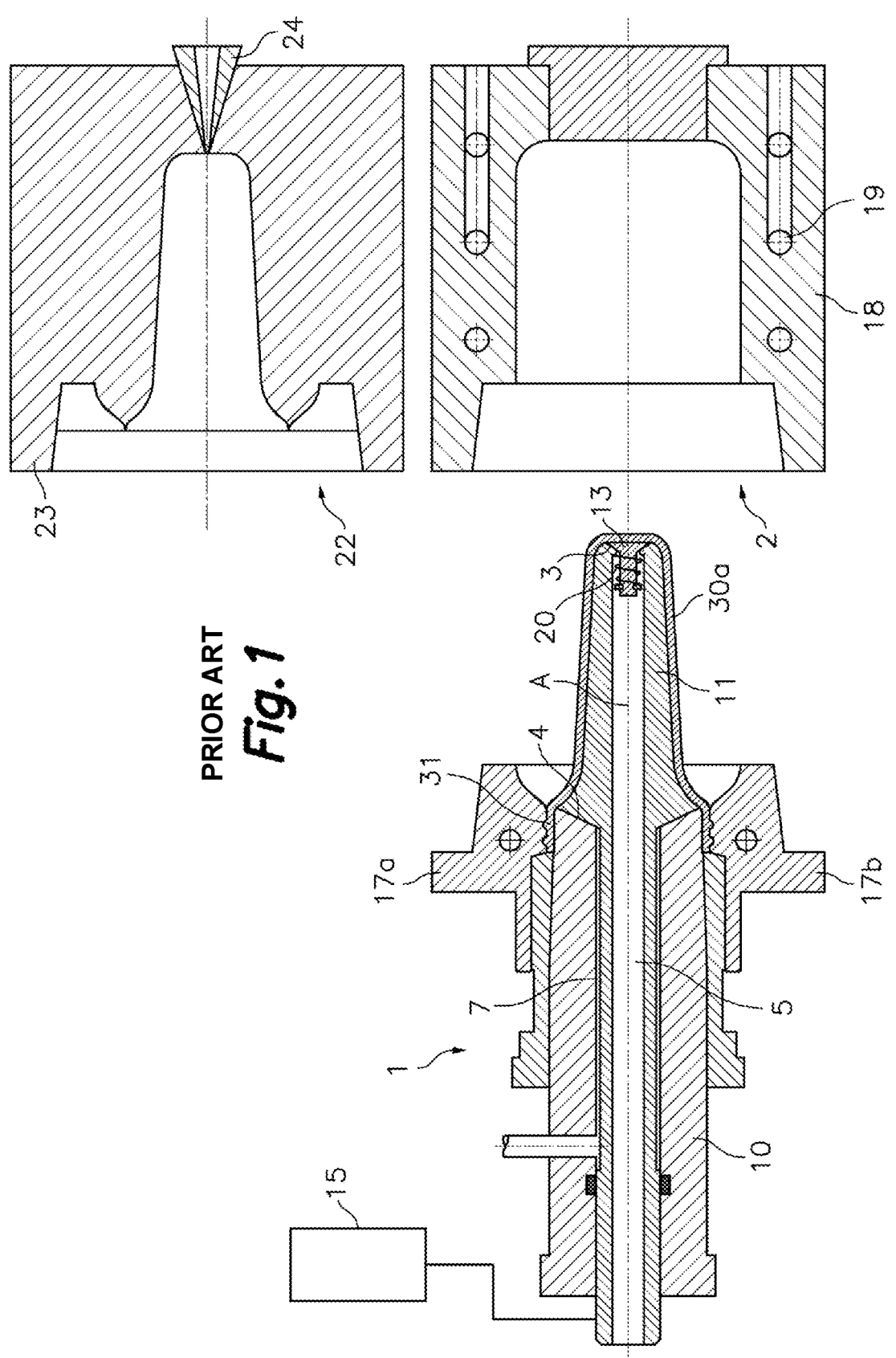
FIG. 1 is a cross sectional view of a punch, an injection-moulding cavity and a blow-moulding cavity belonging to an injection-blow-moulding mould according to the cited prior art (see DE2605967A), in an open position.
Figure 2:
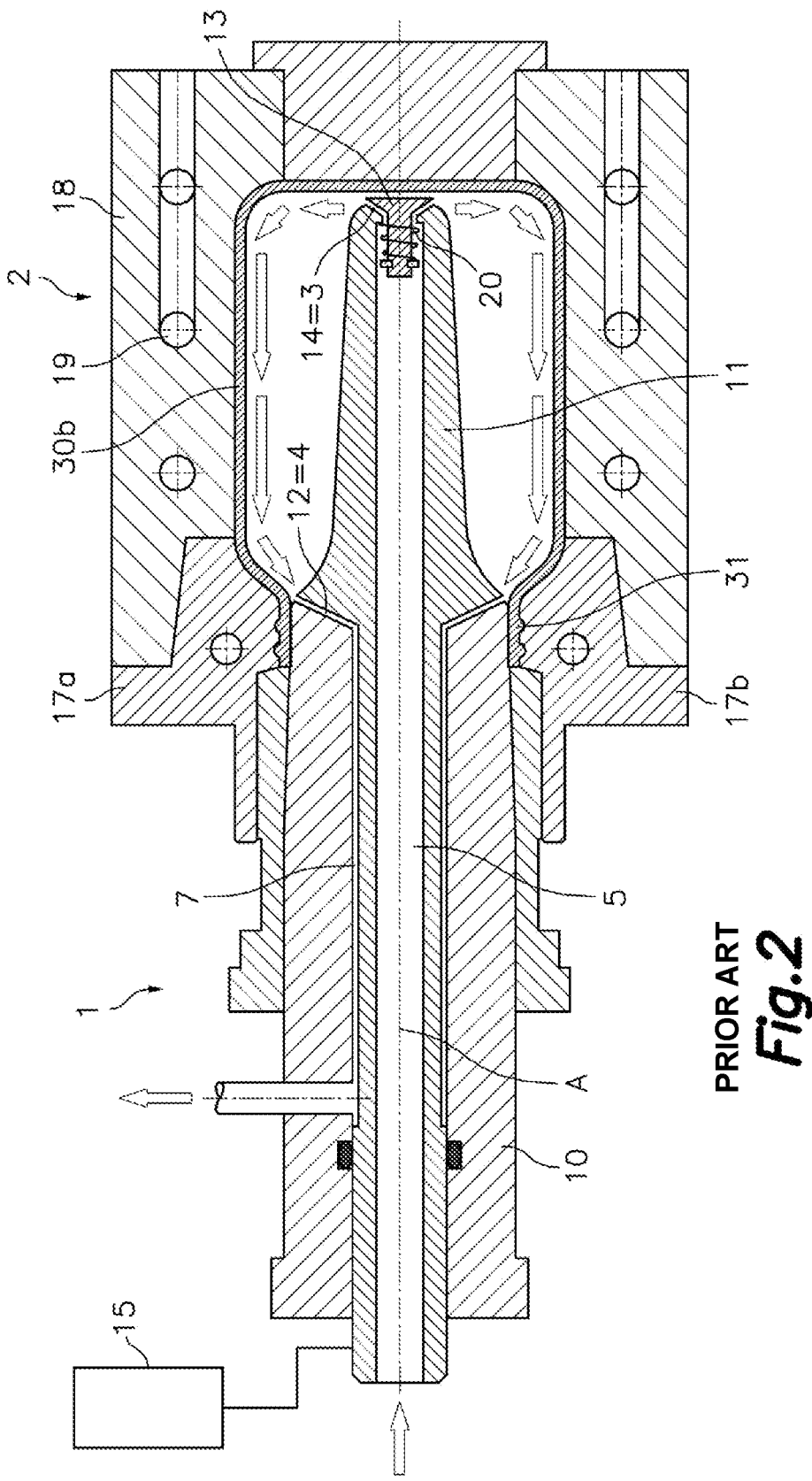
FIG. 2 is a cross sectional view of the punch and the blow-moulding cavity of FIG. 1, in a closed position.

Referring first to FIGS. 1 and 2, reference signs 1, 22 and 2 designate a punch, an injection-moulding cavity and a blow-moulding cavity, respectively, of an injection-blow-moulding mould according to a first embodiment of the present invention. In FIGS. 1 and 2 some elements belonging to a blowing device have been omitted since they will be explained in detail below with reference to FIGS. 3A, 3B; 4A, 4B; and 5A, 5B.

The punch 1 has a longitudinal axis A and the injection-moulding cavity 22 and the blow-moulding cavity 2 have respective longitudinal axes, for example parallel to the longitudinal axis A of the punch 1. A transfer device (not shown) is configured for transferring the punch from the inside of the injection-moulding cavity to the inside of the blow-moulding cavity, and vice versa.

The punch 1 has an outer surface defining an inner surface of a preform 30a and the injection-moulding cavity 22, which is formed in an injection-moulding block 23, defines an outer surface of the preforms 30a. The injection-moulding cavity 22 is configured to receive therein the punch 1 in a closed position (not shown) and the injection-moulding block 23 has an injection nozzle 24 through which an injection device is allowed to inject a molten plastic material to the injection-moulding cavity 22 to form the preform 30a by injection moulding, as is conventional in the prior art.

The punch 1 and the blow-moulding cavity 2, when are mutually aligned as shown in FIGS. 1 and 2, are movable between an open position (FIG. 1), in which the punch 1 and the blow-moulding cavity 2 are separated from each other, and a closed position (FIG. 2), in which the punch 1 is coupled to the blow-moulding cavity 2 forming together the injection-blow-moulding mould.

The blow-moulding cavity 2 has an inner surface defining an outer surface of a container 30b to be obtained by blowing or blow-moulding mould the preform 30a. The punch 1 carries arranged thereon one of the preforms 30a in a hot and soft state when the punch 1 is received in the blow-moulding cavity 2 to form a blow-moulding mould. In the illustrated example, the preform 30a has a neck portion 31 formed in cooperation with two neck half-moulds 17a, 17b which move together with the punch 1 and which are also coupled to the blow-moulding cavity 2 in the mould closed position.

The punch 1 is comprised of a base body 10, a forming body 11, and a valve body 13. The forming body 11 is movable with respect to the base body 10 in an axial direction coaxial to the longitudinal axis A of the punch 1 between a closed position (FIG. 1), in which there is no gap between the base body 10 and the forming body 11, and an open position (FIG. 2), in which a gap providing a proximal gas passage 12 is formed between the base body 10 and the forming body 11. The valve body 13 is movable with respect to the forming body 11 in the axial direction between a closed position (FIG. 1), in which there is no gap between the forming body 11 and the valve body 13, and an open position (FIG. 2), in which a gap providing a distal gas passage 14 is formed between the forming body 11 and the valve body 13.

The proximal gas passage 12 is formed all around the longitudinal axis A of the punch 1 and is located at a proximal area of the punch 1 defining a region of the preform 30a intended to form a shoulder of the container 30b, and the distal gas passage 14 is formed all around the longitudinal axis A of the punch 1 and is located at a distal area of the punch 1 defining a region of the preform 30a intended to form a bottom of the container 30b. In the first embodiment shown in FIGS. 1 and 2, the distal gas passage 14 constitutes a blow opening 3 which is connected to a first conduit 5 and the proximal gas passage 12 constitutes an exhaust opening 4 connected to a second conduit 7.

In this first embodiment as per the state of the art, an actuator 15 (symbolically depicted in FIGS. 1 and 2) is operatively connected to move the forming body 11 between the open position and the closed position, and an elastic element 20 is arranged to bias the valve body 13 to the closed position. The elastic element 20 is, for example, a helical spring set to allow the valve body 13 to be moved to the open position by the effect of a particular pressure in the first conduit 5.

The aforementioned blowing device is configured to deliver a pressurised gas to the interior of the hot and soft preform 30a through the blow opening 3 to expand the preform 30a against the inner surface of the blow-moulding cavity 2 in order to form one of the containers 21, and to allow the gas inside the expanded container 30b to escape, under certain conditions that will be explained below, through the exhaust opening 4.

Thereby, as indicated by the thick arrows in FIG. 2, once the container 30b is formed and before it is extracted from the blow-moulding mould, a gas stream is created inside the container 30b, from the blow opening 3 adjacent the bottom of the container 30b to the exhaust opening 4 adjacent the shoulder of the container 30b, that cools an inner surface of the container 30b. For this reason, the blow opening 3 and the exhaust opening 4 are located in the punch 1 at respective positions the most spaced apart possible from each other.

The blow-moulding cavity 2 is formed in blow-moulding blocks 18 inside which cooling conduits 19 are arranged, and a cooling device is configured for circulating a cooling fluid via the cooling conduits 19 in order to cool the inner surface of the blow-moulding cavity 2 and the outer surface of the container 30b in contact therewith. Thus, both the inner and outer surfaces of the container 30b are cooled before the container 30b is extracted from the blow-moulding mould, which shortens the cycle time and increases the production rate.

First (according to the state of the art), second and third variants of the blowing device and the operation thereof are explained now with reference to FIGS. 3A, 3B, FIGS. 4A, 4B, and FIGS. 5A, 5B, respectively, in cooperation with the elements of the first embodiment.

All the first, second and third variants of the blowing device have in common that the first conduit 5 to which the blow opening 3 is connected is in communication with a first source of pressurised gas supply 6 configured to supply pressurised gas through the blow opening 3 at an overpressure OP, for example 12 bar, above a blowing pressure BP, for example 9 bar, wherein the blowing pressure BP is a pressure suitable to completely expand the preform 30a until it is applied against the inner surface of the blow-moulding cavity 2 and acquires the shape of the container 30b.

However, in the first, second and third variants of the blowing device, the second conduit 7 to which the exhaust opening 4 is connected is in communication with a pressure-limiting device set at the blowing pressure BP. The pressure-limiting device, which is different for each variant, is configured to allow the gas inside the container 30b, when it exceeds the blowing pressure BP, to escape through the exhaust opening 4.

Figure 3B:
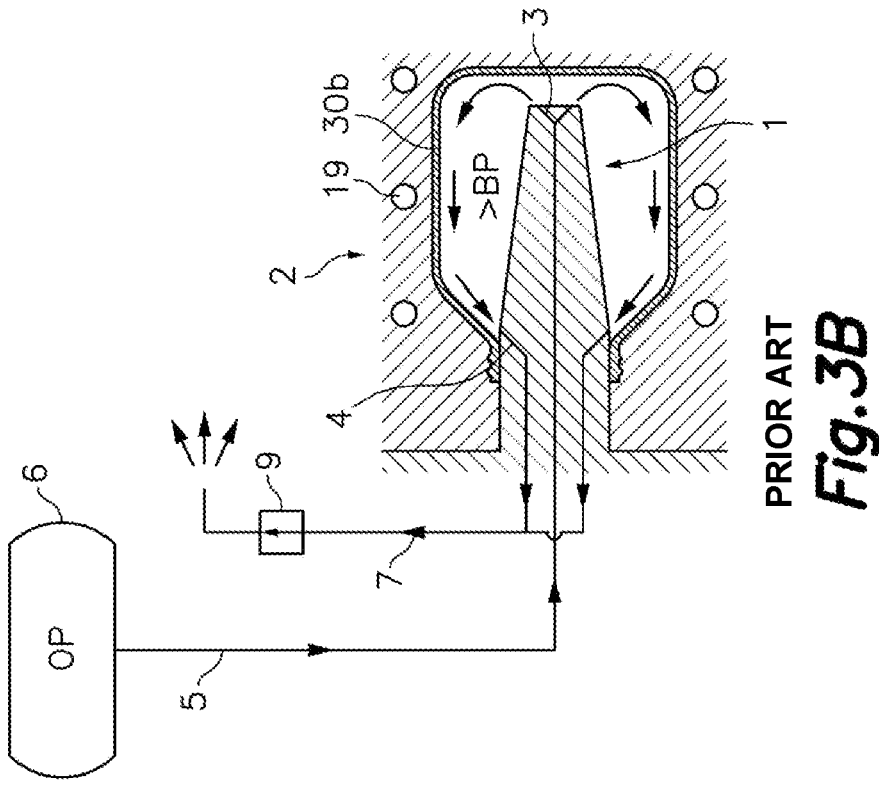
FIGS. 3A and 3B are diagrammatic views of the punch and the blow-moulding cavity of FIGS. 1 and 2 in cooperation with a first variant of a blowing device in two different operating stages.
Figure 3A:
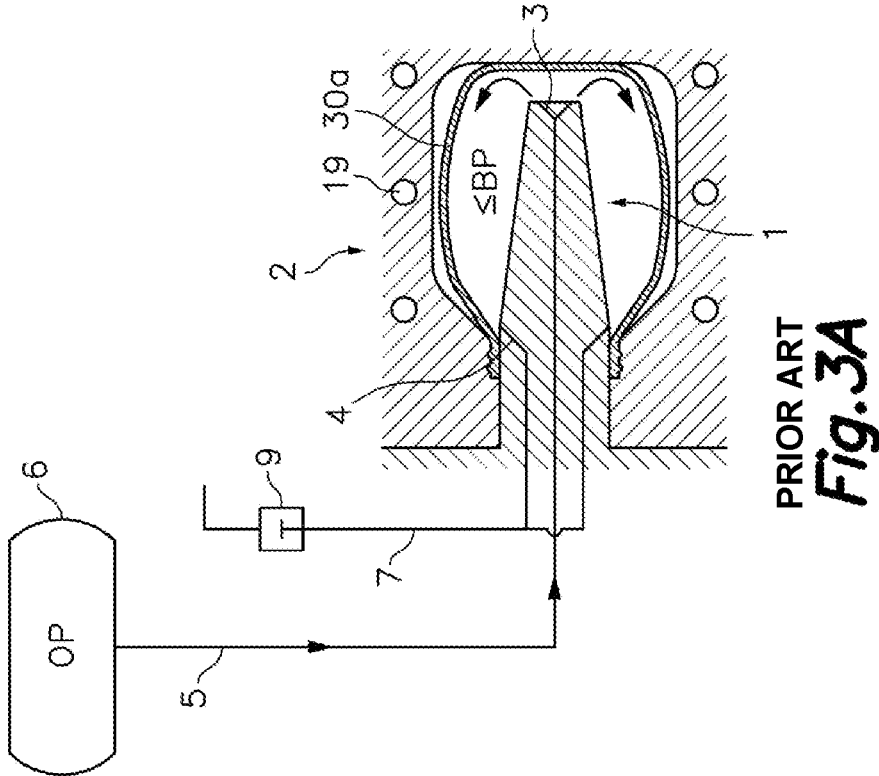

In the first variant of the blowing device shown in FIGS. 3A and 3B, the pressure-limiting device which is in communication with the second conduit 7 connected to the exhaust opening 4 simply comprises a pressure-limiting valve 9 (see FIGS. 3A and 3B) set at the blowing pressure BP.

As shown in FIG. 3A, when performing a blowing operation with the second variant of the blowing device, firstly pressurized gas from the first source of pressurised gas supply 6, at the overpressure OP, is supplied through the blow opening 3 to the interior of the preform 30a, thereby the preform 30a begins to expand and the pressure inside it raises from a pressure below the blowing pressure BP towards the blowing pressure BP while the pressure-limiting valve 9 remains closed.

Then, as shown in FIG. 3B, when the preform 30a has been completely expanded against the inner surface of the blow-moulding cavity 2 to form the container 30b, the first source of pressurised gas supply 6 continues supplying pressurized gas at the overpressure OP through the blow opening 3 and the pressure inside the container 30b raises to a level that exceeds the blowing pressure BP, which causes the pressure-limiting valve 9 to open, thereby allowing the gas inside the container 30b to escape through the exhaust opening 4 thus creating a cooling gas stream inside the container 30b from the blow opening 3 to the exhaust opening 4.

Figure 4B:
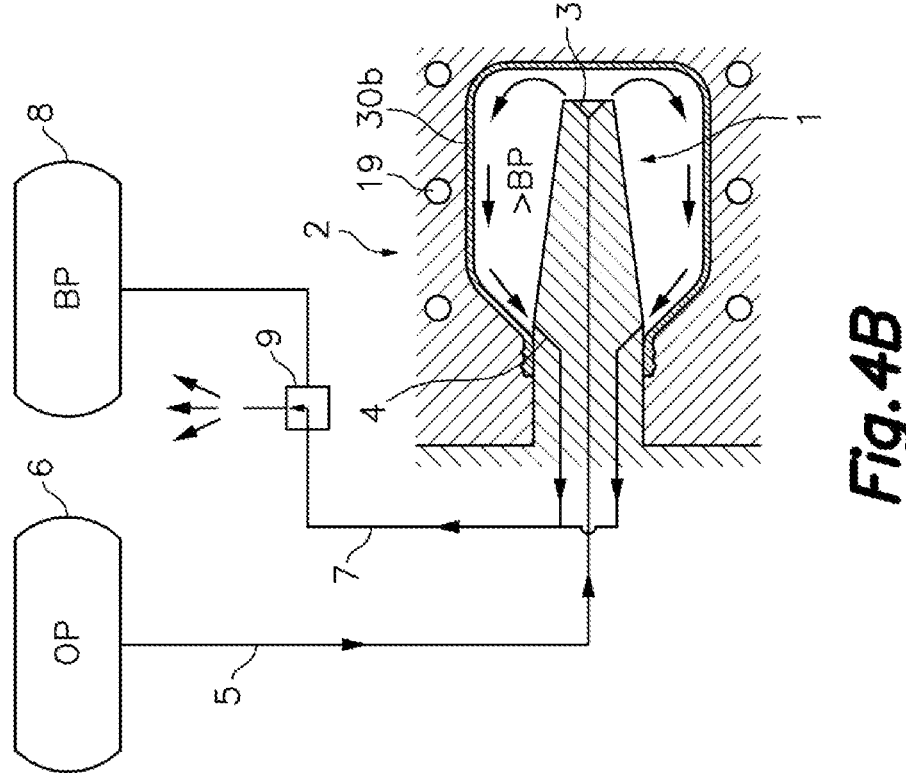
FIGS. 4A and 4B are diagrammatic views of the punch and the blow-moulding cavity of FIGS. 1 and 2 in cooperation with the blowing device in two different operating stages in accordance with the principles of the present invention.
Figure 4A:
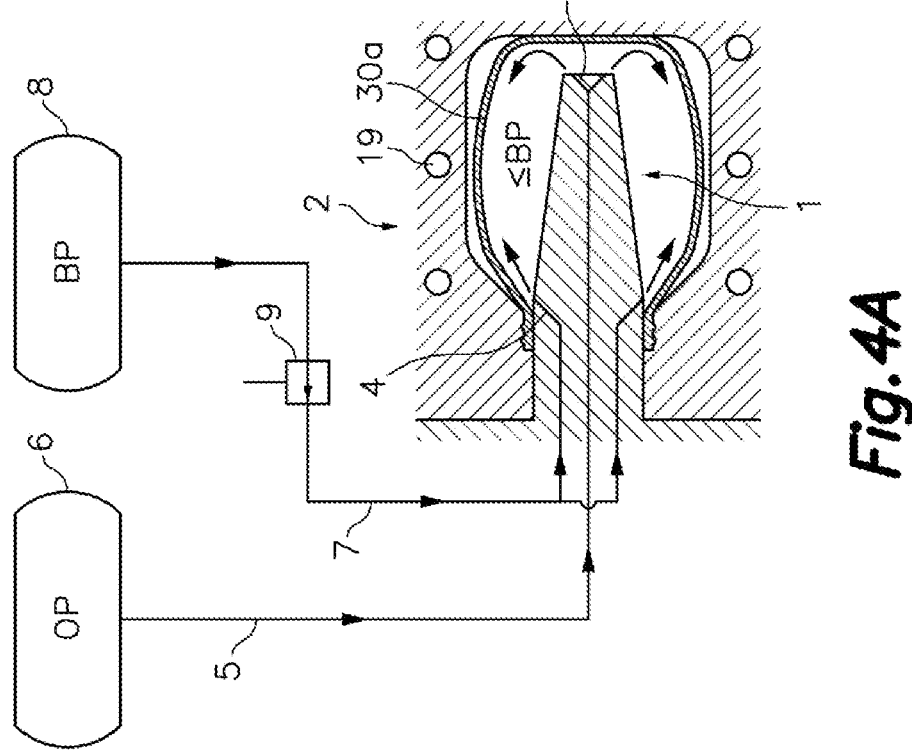

In a second variant of the blowing device as per a first embodiment of this invention shown FIGS. 4A and 4B, the pressure-limiting device which is in communication with the second conduit 7 connected to the exhaust opening 4 comprises a second pressurised gas supply source 8 in communication with the second conduit 7 and a pressure-limiting valve 9 located in the second conduit 7 between the exhaust opening 4 and the second pressurised gas supply source 8. The second pressurised gas supply source 8 is configured to supply pressurised gas through the exhaust opening 4 at the blowing pressure BP. The pressure-limiting valve 9 is configured to allow the pressurized gas at the blowing pressure BP to flow from the second pressurised gas supply source 8 to the interior of the preform 30a through the exhaust opening 4 when the pressure in the interior of the preform 30a is below or at the blowing pressure BP and to allow the pressurized gas to escape from the interior of the container 30b through the exhaust opening 4 when the pressure in the interior of the container 30b is above the blowing pressure BP.

As shown in FIG. 4A, when performing a blowing operation with the second variant of the blowing device in accordance with the principles of this invention, firstly pressurized gas from the first source of pressurised gas supply 6, at the overpressure OP, is supplied through the blow opening 3 to the interior of the preform 30a and at the same time pressurized gas from the second source of pressurised gas supply 8, at the blowing pressure BP, is supplied through the pressure-limiting valve 9 and the exhaust opening 4 to the interior of the preform 30a, thereby the preform 30a begins to expand and the pressure inside it raises from a pressure below the blowing pressure BP towards the blowing pressure BP.

Then, as shown in FIG. 4B, when the preform 30a has been completely expanded against the inner surface of the blow-moulding cavity 2 to form the container 30b, the first source of pressurised gas supply 6 continues supplying pressurized gas at the overpressure OP through the blow opening 3, which makes the pressure inside the container 30b to exceed the blowing pressure BP thereby causing the gas inside the container 30b to escape through the exhaust opening 4 and the pressure-limiting valve 9 to shift closing the gas passage back to the second source of pressurised gas supply 8 and allowing the gas to escape from the pressure-limiting valve 9, thus creating a cooling gas stream inside the container 30b from the blow opening 3 to the exhaust opening 4.

Figures 5A, 5B:
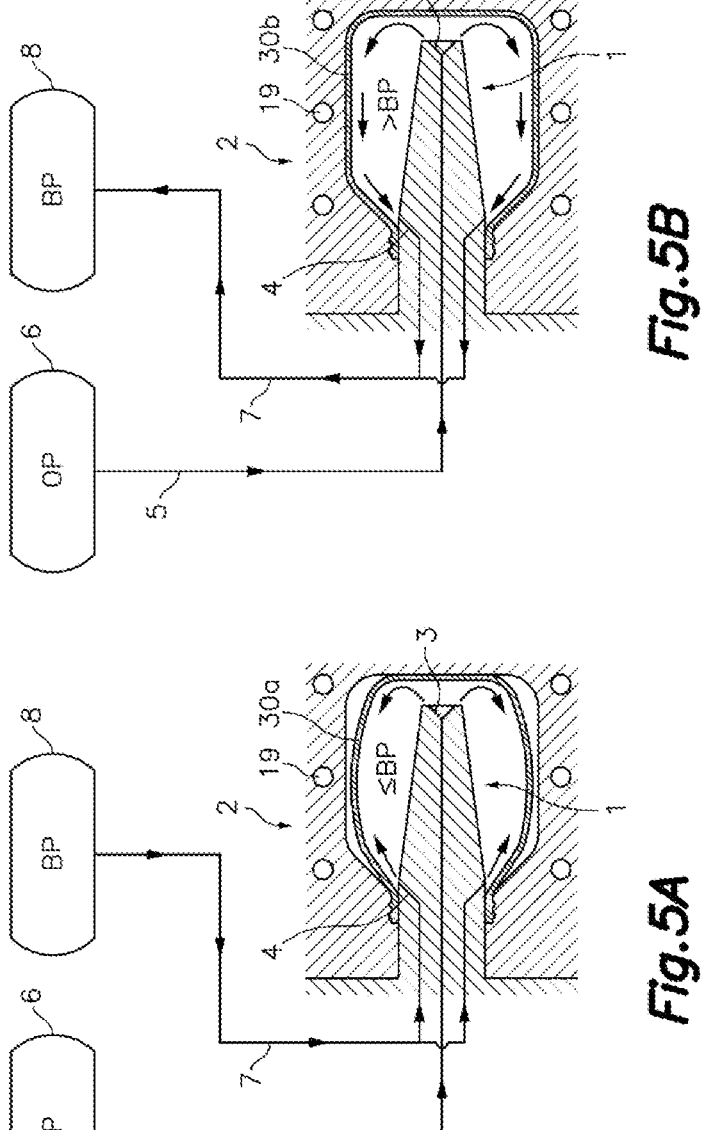
FIGS. 5A and 5B are diagrammatic views of the punch and the blow-moulding cavity of FIGS. 1 and 2 in cooperation with a third variant of the blowing device as per one additional embodiment forming part of this invention in two different operating stages.

In the third variant of the blowing device as per this invention that is shown n FIGS. 5A and 5B, the pressure-limiting device which is in communication with the second conduit 7 connected to the exhaust opening 4 comprises a second pressurised gas supply source 8 configured to supply pressurised gas through the exhaust opening 4 at the blowing pressure BP and to retrieve pressurized gas flowing out the container 30b through the exhaust opening 4 when the pressure in the interior of the container 30b is above the blowing pressure BP.

As shown in FIG. 5A, when performing a blowing operation with the third variant of the blowing device, firstly pressurized gas from the first source of pressurised gas supply 6, at the overpressure OP, is supplied through the blow opening 3 to the interior of the preform 30a and at the same time pressurized gas from the second source of pressurised gas supply 8, at the blowing pressure OP, is supplied through the exhaust opening 4 to the interior of the preform 30a, thereby the preform 30a begins to expand and the pressure inside it raises from a pressure below the blowing pressure BP towards the blowing pressure BP.

Then, as shown in FIG. 5B, when the preform 30a has been completely expanded against the inner surface of the blow-moulding cavity 2 to form the container 30b, the first source of pressurised gas supply 6 continues supplying pressurized gas at the overpressure OP through the blow opening 3, which makes the pressure inside the container 30b to exceed the blowing pressure BP and allows the gas inside the container 30b to escape through the exhaust opening 4 to return to the second source of pressurised gas supply 8 creating a cooling gas stream inside the container 30b from the blow opening 3 to the exhaust opening 4.

The blowing device according to any one of the first, second or third variants can comprise other valve elements and/or accessories (not shown) which are of common use in pneumatic circuits, and which would not alter the operation of the blowing device as explained above.

When using the blowing device according to the first variant shown in FIGS. 3A and 3B or to the second variant shown in FIGS. 4A and 4B, the compressed gas output generated by the pressure in excess to the blow pressure BP through the exhaust opening 4 and the pressure-limiting valve 9 may be advantageously directed to a suitably dimensioned tank (not shown) or to a network pressurized gas line (not shown), so that this pressurized gas, which is near to the blow pressure BP, can be used for any other purpose, such as driving pneumatic pistons or other accessory elements of the same injection-blow-moulding mould or other machine or equipment.

Thus, an increased consumption of pressurized gas due to the cooling gas stream created inside the container 30b is mitigated by being able to use the exhausted pressurized gas for driving other pneumatic mechanisms.

The use of a second source of pressurised gas supply 8 in addition to the first source of pressurised gas supply 6, as with the blowing device according to the second variant shown in FIGS. 4A and 4B or to the third variant shown in FIGS. 5A and 5B, implementing the principles of this invention allows the blow pressure BP to be reached more quickly inside the container 30b thereby contributing to additionally reduce the cycle time and to increase the productivity of the system.

When using the blowing device according to the third variant shown in FIGS. 5A and 5B, it has to be taken into account that the pressurized gas coming out from the exhaust opening 4 which is returned to the second source of pressurised gas supply 8 is relatively hot after having been cooling the inner surface of the container 30b and preferably must be cooled back before being supplied again to the interior of a container 30b in a subsequent blowing cycle.

When any one of the second or third variants of the blowing device is applied to the first embodiment shown in FIGS. 1 and 2, the elastic element 20 is set to allow the valve body 13 to be moved to the open position by the effect of the overpressure OP in the first conduit 5 provided by the first source of pressurised gas supply 6.

Figure 6:
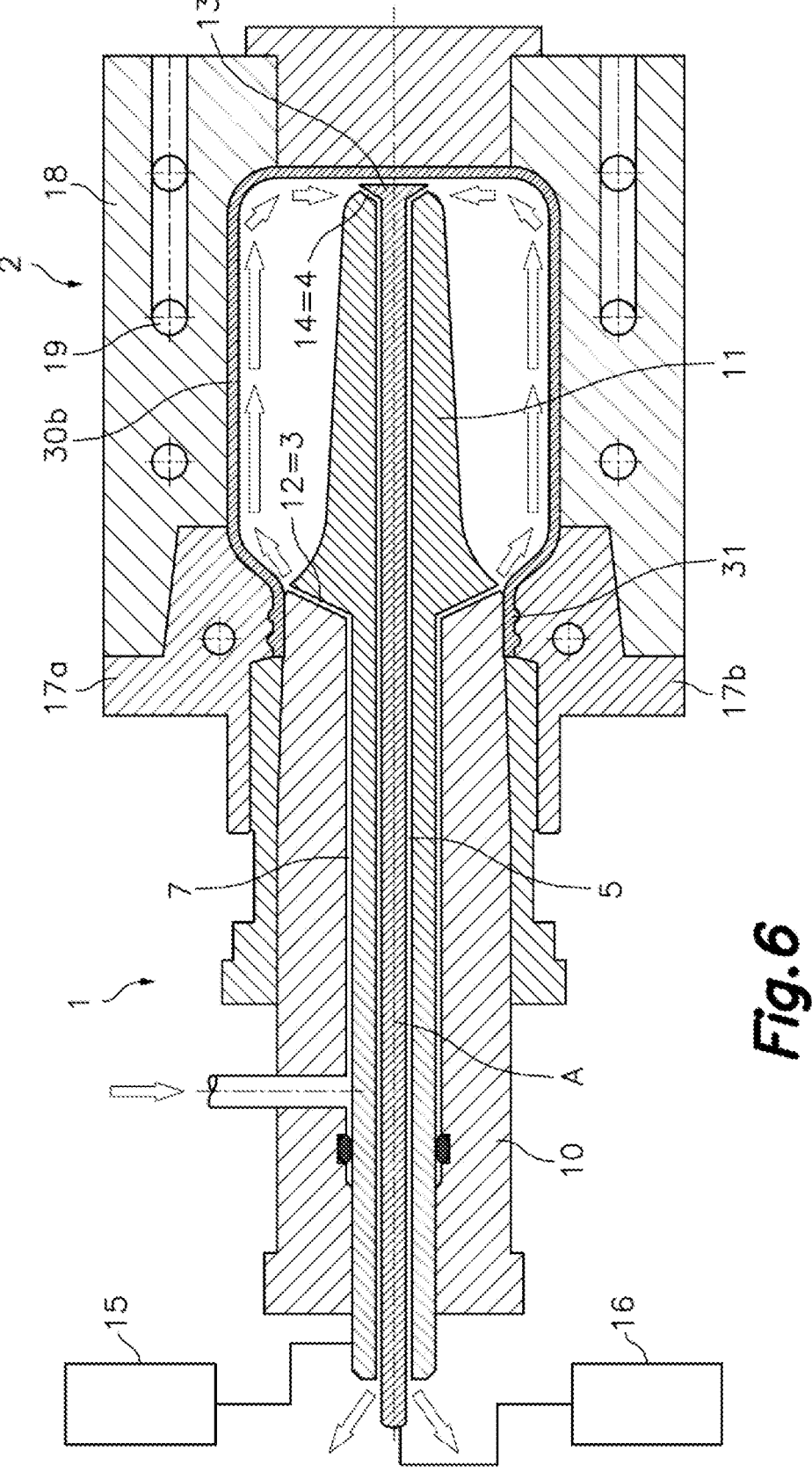
FIG. 6 is a cross sectional view of a punch and a blow-moulding cavity belonging to an injection-blow-moulding mould according to a second example in a closed position.

FIG. 6 shows an injection-blow-moulding mould according to a second of the present invention which mainly differs from the first example described above with reference to FIGS. 1 and 2 in that the proximal gas passage 12 is connected to the first conduit 5 and thereby constitutes the blow opening 3 and the distal gas passage 14 is connected to the second conduit 7 and thereby constitutes the exhaust opening 4. The second example further differs from the first example in that a second actuator 16 (symbolically depicted in FIG. 6) is operatively connected to move the valve body 13 between the open position and the closed position instead of the elastic element.

The blow opening 3 is formed all around the longitudinal axis A of the punch 1 and is located at a proximal area of the punch 1 defining a region of the preform 30a intended to form a shoulder of the container 30b and the exhaust opening 4 is formed all around the longitudinal axis A of the punch 1 and is located at a distal area of the punch 1 defining a region of the preform 30a intended to form a bottom of the container 30b. So, in this second embodiment the cooling gas stream (indicated by arrows in FIG. 6) created inside the container 30b flows in an opposite direction to that of the first embodiment with an equivalent result.

Any one of the second and third variants of the blowing device shown in FIGS. 3A, 3B; 4A, 4B; and 5A, 5B may be applied to the second embodiment shown in FIG. 6.

In both the first and second examples of an injection-blow-moulding mould shown in FIGS. 1 and 2, and 6, the blow-moulding cavity 2 has a cylindrical inner surface intended to form a cylindrical body portion of the container 30b while the two neck half-moulds 17a, 17b are intended to form the neck and shoulder portions of the container 30b. This allows for the mould to open and the container 30b to be extracted from the blow-moulding cavity 2 in the axial direction. However, alternatively one pair of half blow-moulding cavities opening radially could be provided for forming containers having a more complex body shape without departing from the scope of the present invention.

The present invention also provides an injection-blow-moulding method which may be practiced by any of the first and second examples of an injection-blow-moulding mould in cooperation with any of the second and third variants of the blowing device, the method comprising the following steps, known in the art:

Initially, receiving a punch 1 defining an inner surface of preforms 30a in an injection-moulding cavity 22 defining an outer surface of the preforms 30a, and then injecting a molten plastic material in the injection-moulding cavity 22 through at least one injection nozzle 24 of an injection device when the punch 1 is located inside the injection-moulding cavity 22 to form one of the preforms 30a.

subsequently, receiving the punch 1 with one of the preforms 30a arranged on the punch 1 in a hot and soft state inside a blow-moulding cavity 2, the blow-moulding cavity 2 defining an outer surface of a container 30b to be obtained by blowing the preform 30a.

then, delivering a pressurised gas at an overpressure OP to the interior of the preform 30a through at least one blow opening 3 located in the punch 1 when the punch 1 carrying the preform 30a is located inside the blow-moulding cavity 2, the pressurised gas at the overpressure OP being supplied by a first source of pressurised gas supply 6, and with the overpressure OP being above a blowing pressure BP suitable or enough to expand the preform 30a into the container 30b by blow-moulding, and finally causing the pressurized gas to escape from the interior of the container 30b through an exhaust opening 4 provided in the punch 1 and located at a position spaced apart from the blow opening 3 when the pressure in the interior of the container 30b is above the blowing pressure BP, the exhaust opening 4 being connected to a second conduit 7 which is in communication with a pressure-limiting device set at the blowing pressure BP.

Thereby a gas stream is created from the blow opening 3 to the exhaust opening 4 when the gas inside the container 30b exceeds the blowing pressure BP, and the gas stream cools an inner surface of the container 30b at the same time the outer surface of the container 30b in contact with the blow-moulding cavity 2 is cooled by a cooling device associated to the blow-moulding cavity 2.

As pre the principles of this invention the method further comprises:

supplying by means of a second pressurised gas supply source (8) in communication with the second conduit (7) pressurised gas through the at least one exhaust opening (4) at the blowing pressure (BP) retrieving pressurized gas flowing out the container (30b) through the at least one exhaust opening (4) when the pressure in the interior of the container (30b) is above the blowing pressure (BP).

The scope of the present invention is defined by the attached claims.

The invention claimed is:

1. An injection-blow-moulding mould comprising:
a punch, which is elongated in an axial direction and non-expandable, defining an inner surface of a preform;
a blow-moulding cavity defining an outer surface of a container obtained by blowing the preform in the blow-moulding cavity, the blow-moulding cavity being configured to receive therein the punch with the preform arranged on the punch in a hot and soft state;
a blowing device configured to deliver a pressurised gas to the interior of the preform through at least one blow opening located in the punch when the punch carrying the preform is located inside the blow-moulding cavity; and
the at least one blow opening is connected to a first conduit which is disposed in communication with a first source of pressurised gas supply configured to supply pressurised gas through the at least one blow opening at an overpressure above a blowing pressure, to inflate the preform into the blow-moulding cavity to become the container creating an interspace between the punch and an inner surface of the container, the blowing pressure being a pressure suitable to blow the preform into the container; and
the blowing device further comprises at least one exhaust opening located in the punch and a pressure-limiting device connected to the at least one exhaust opening through a second conduit, the pressure-limiting device is set to open evacuating the gas from inside the container through the at least one exhaust opening when the gas inside the interspace reaches or exceeds the blowing pressure;
the at least one exhaust opening and the at least one blow opening are spaced apart in the axial direction, at opposed distal ends of the punch, and are both in direct communication with an entire inner volume of the interspace, with no interposed material between the at least one exhaust opening, the at least one blow opening and the inner surface of the container, creating a continuous gas stream inside the interspace in the axial direction, from the at least one blow opening to the at least one exhaust opening, in direct contact with the inner surface of the container, providing primary cooling for the container;
the pressure-limiting device comprises a second pressurised gas supply source disposed in communication with the second conduit and configured to supply pressurised gas through the at least one exhaust opening at the blowing pressure and to retrieve pressurized gas flowing out the container through the at least one exhaust opening when the pressure in the interior of the container is above the blowing pressure.

2. The injection-blow-moulding mould according to claim 1, wherein the pressure-limiting device comprises a pressure-limiting valve disposed in the second conduit and configured to allow the pressurized gas to escape from the interior of the container through the at least one exhaust opening when the pressure in the interior of the container is above the blowing pressure.

3. The injection-blow-moulding mould according to claim 1 wherein the injection-blow-moulding mould further comprises a cooling device configured to cool an inner surface of the blow-moulding cavity and the outer surface of the container in contact therewith.

4. The injection-blow-moulding mould according to claim 1, wherein the second pressurised gas supply source is configured to supply pressurised gas through the at least one exhaust opening at the blowing pressure, and a pressure-limiting valve located in the second conduit and configured to allow the pressurized gas to flow from the second pressurised gas supply source to the interior of the preform through the at least one exhaust opening when the pressure in the interior of the preform is disposed below or at the blowing pressure and to allow the pressurized gas to escape from the interior of the container through the at least one exhaust opening when the pressure in the interior of the container is above the blowing pressure.

5. The injection-blow-moulding mould according to claim 1, further comprising an opening and closing device configured to open and close the at least one blow opening and the at least one exhaust opening when the punch carrying the preform is located inside the blow-moulding cavity.

6. The injection-blow-moulding mould according to claim 5, wherein the punch comprises a base body and a forming body, the forming body being movable with respect to the base body in an axial direction that is coaxial to a longitudinal axis of the punch between an open position, in which a gap between the base body and the forming body provides a proximal gas passage, and a closed position, in which there is no gap or gas passage between the base body and the forming body.

7. The injection-blow-moulding mould according to claim 6, wherein the punch further comprises a valve body that is movable with respect to the forming body in the axial direction between an open position, in which a gap between the forming body and the valve body provides a distal gas passage, and a closed position, in which there is no gap or gas passage between the forming body and the valve body.

8. The injection-blow-moulding mould according to claim 7, wherein the proximal gas passage is connected to the second conduit and constitutes the at least one exhaust opening, and the distal gas passage is connected to the first conduit and constitutes the at least one blow opening.

9. The injection-blow-moulding mould according to claim 7, wherein the proximal gas passage is connected to the first conduit and constitutes the at least one blow opening, and the distal gas passage is connected to the second conduit and constitutes the at least one exhaust opening.

10. The injection-blow-moulding mould according to claim 8, further comprising:

an actuator operatively connected to move the forming body between the open position and the closed position; or an elastic element arranged to bias the valve body to the closed position, the elastic element being set to allow the valve body to be moved to the open position by the effect of the overpressure in the first conduit.

11. The injection-blow-moulding mould according to claim 9, further comprising:

a first actuator operatively connected to move the forming body between the open position and the closed position, or a second actuator operatively connected and configured to move the valve body between the open position and the closed position.

12. The injection-blow-moulding mould according to claim 7, wherein the proximal gas passage and the distal gas passage are formed all around the longitudinal axis of the punch.

13. The injection-blow-moulding mould according to claim 1, wherein the at least one blow opening is provided by a distal gas passage formed all around a longitudinal axis of the punch and located at a distal area of the punch defining a region of the preform intended to form a bottom of the container and the at least one exhaust opening is provided by a proximal gas passage formed all around the longitudinal axis of the punch and located at a proximal area of the punch defining a region of the preform intended to form a shoulder of the container, or located at a distal area of the punch defining a region of the preform intended to form a bottom of the container.

14. The injection-blow-moulding mould according to claim 2 wherein the injection-blow-moulding mould further comprises a cooling device configured to cool an inner surface of the blow-moulding cavity and the outer surface of the container in contact therewith.

15. The injection-blow-moulding mould according to claim 1 wherein the blowing device is configured to continue to supply pressurized gas at the overpressure through the blow opening once the preform has been completely expanded against the inner surface of the blow-moulding cavity, maintaining the gas stream.

16. An injection-blow-moulding method comprising:

receiving a punch, which is elongated in the axial direction and non-expandable, with a preform arranged on the punch in a hot and soft state, inside a blow-moulding cavity defining an outer surface of a container to be obtained by blowing the preform;

delivering a pressurised gas to the interior of the preform through at least one blow opening located in the punch when the punch carrying the preform is located inside the blow-moulding cavity;

supplying, by means of a first source of pressurised gas supply in communication with a first conduit and through the at least one blow opening, a pressurised gas at an overpressure above a blowing pressure, inflating the preform into the blow-moulding cavity the preform becoming the container and creating an interspace between the punch and an inner surface of the container, the blowing pressure being a pressure suitable to blow the preform into the container; and causing the pressurized gas to escape from the interior of the container through at least one exhaust opening provided in the punch when the pressure in the interior of the container is above the blowing pressure by connecting the at least one exhaust opening to a second conduit that is in communication with a pressure-limiting device set at the blowing pressure, while maintaining the supply of pressurised gas creating a continuous gas stream inside the hollow chamber in the axial direction, between opposed distal ends of the punch separated in the axial direction where the at least one blow opening and the at least one exhaust opening are located, the continuous gas stream being in direct contact with an inner surface of the container, with no interposed material between the at least one exhaust opening, the at least one blow opening and the inner surface of the container, providing primary cooling for the container;

the method further comprising:

supplying by means of a second pressurised gas supply source in communication with the second conduit, the pressurised gas through the at least one exhaust opening at the blowing pressure retrieving pressurized gas flowing out the container through the at least one exhaust opening when the pressure in the interior of the container is above the blowing pressure.

17. The injection-blow-moulding method according to claim 16 wherein the method comprises maintaining the supply of pressurized gas at the overpressure through the blow opening once the preform has been completely expanded against the inner surface of the blow-moulding cavity, maintaining the gas stream.

\* \* \* \* \*